US012664593B2

(12) United States Patent
Clark

(10) Patent No.: US 12,664,593 B2
(45) Date of Patent: *Jun. 23, 2026

(54) GESTURE-ENABLED INTERFACES, SYSTEMS, METHODS, AND APPLICATIONS FOR CUSTOM DESIGNING NON-LEVEL LIFE INSURANCE BENEFITS POLICIES AND SUPPORTING CUSTOMIZED PRICING

(71) Applicant: AmerUs Group Inc., Clive, IA (US)

(72) Inventor: Brian James Clark, Clive, IA (US)

(73) Assignee: AMERUS GROUP INC., Clive, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/439,643

(22) Filed: Feb. 12, 2024

(65) Prior Publication Data

US 2024/0386503 A1 Nov. 21, 2024

Related U.S. Application Data

(63) Continuation of application No. 18/199,282, filed on May 18, 2023, now Pat. No. 11,928,743.

(51) Int. Cl.
*G06Q 40/08* (2012.01)

(52) U.S. Cl.
CPC .................................. *G06Q 40/08* (2013.01)

(58) Field of Classification Search
CPC ..................................................... G06Q 40/80
See application file for complete search history.

(56) References Cited

U.S. PATENT DOCUMENTS

| | | | | | |
|---|---|---|---|---|---|
| 5,956,691 A * | 9/1999 | Powers | .................. | G06Q 40/08 705/4 |
| 8,185,463 B1 * | 5/2012 | Ball | ...................... | G06Q 40/06 705/2 |
| 8,271,301 B1 * | 9/2012 | Nordyke | ................ | G06Q 40/08 705/36 R |
| 2002/0091550 A1 * | 7/2002 | White | .................... | G06Q 40/08 705/4 |
| 2002/0111835 A1 * | 8/2002 | Hele | ...................... | G06Q 10/10 705/4 |
| 2010/0305976 A1 * | 12/2010 | Fischer | .................. | G06Q 40/08 705/4 |
| 2012/0072245 A1 * | 3/2012 | Schiminovich | ........ | G06Q 40/08 705/4 |
| 2012/0330687 A1 * | 12/2012 | Hilario | .................. | G06Q 40/08 705/4 |

* cited by examiner

*Primary Examiner* — Matthew S Gart
*Assistant Examiner* — William D Newlon
(74) *Attorney, Agent, or Firm* — Bryan Cave Leighton Paisner LLP

(57) ABSTRACT

This disclosure is directed to systems, methods, apparatuses, and techniques that utilize enhanced gesture-based input mechanisms to facilitate designing custom non-level life insurance benefits policies and supporting customized pricing. These technologies can be specially designed and configured to optimize creation, editing, and/or sharing of life insurance benefits policies. The technologies include multi-gesture functionalities that enable users to view and access various features. Other embodiments are disclosed.

14 Claims, 14 Drawing Sheets

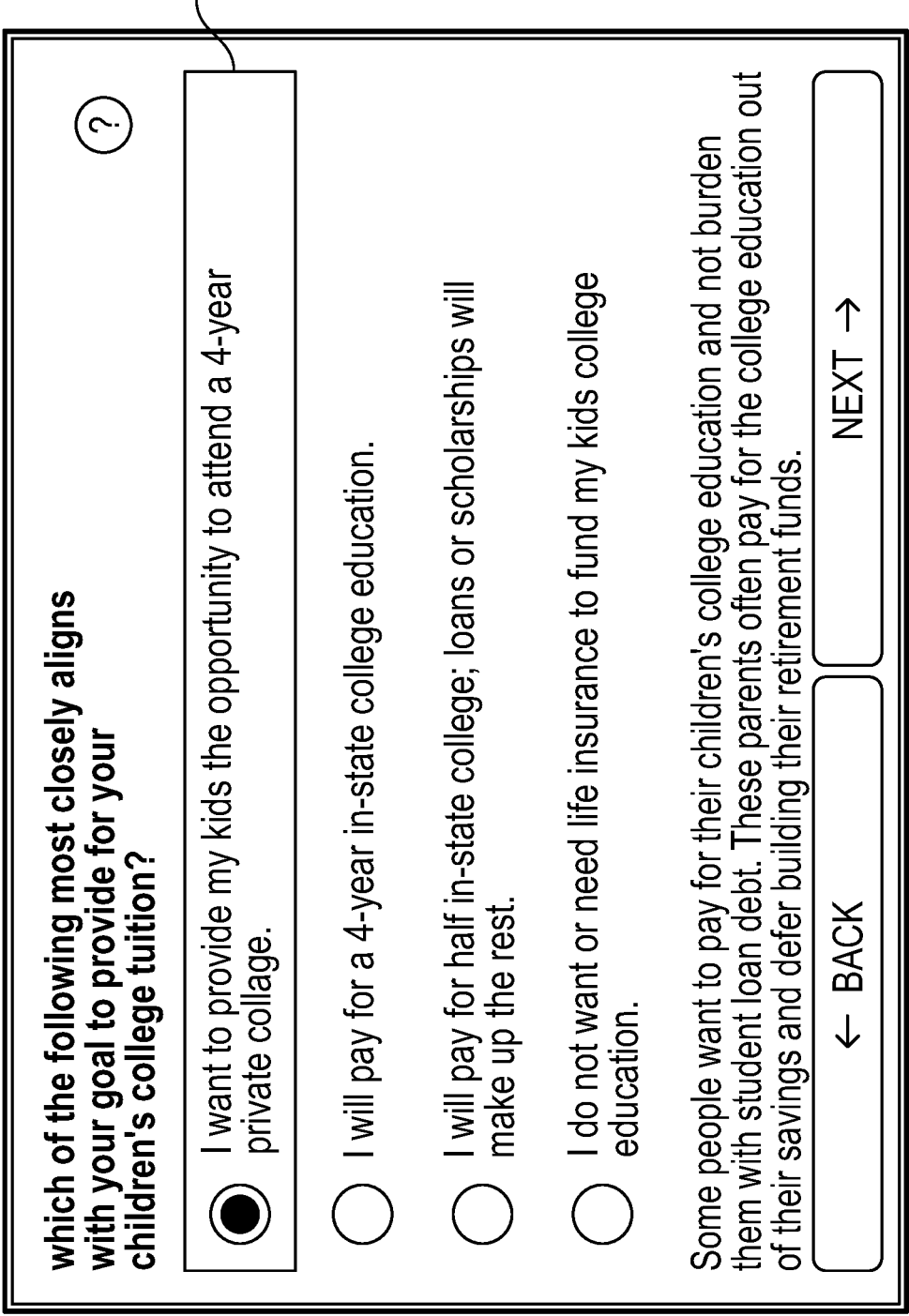

which of the following most closely aligns with your goal to provide for your children's college tuition?

(?)

⦿ I want to provide my kids the opportunity to attend a 4-year private collage.

◯ I will pay for a 4-year in-state college education.

◯ I will pay for half in-state college; loans or scholarships will make up the rest.

◯ I do not want or need life insurance to fund my kids college education.

Some people want to pay for their children's college education and not burden them with student loan debt. These parents often pay for the college education out of their savings and defer building their retirement funds.

← BACK     NEXT →

49 — PRICING ASSUMPTIONS

| Assumption | Value |
|---|---|
| FIRST YEAR MARKETING & SALES COSTS (% PREMIUM) | 180% |
| EXPENSES AS % PREMIUM (ALL YEARS) | 10.5% |
| PER POLICY ISSUE EXPENSES | $ 300.00 |
| PER POLICY ADMINISTRATIVE EXPENSES (ANNUALLY) | $ 150.00 |
| DAC TAX (PRESENT VALUE AS % INITIAL PREMIUM) | 4.99% |
| ANNUAL INFLATION RATE FOR ONGOING EXPENSES | 4.0% |
| PRE-TAX PROFIT MARGIN AS % OF PREMIUM | 10.0% |
| INSURANCE COMPANY'S INVESTMENT YIELD | 3.0% |
| CORPORATE TAX RATE (USED FOR DAC TAX) | 28.0% |

Summary

| | FIXED COVERAGE | CUSTOMIZED | DIFFERENCE | %DIFFERENCE |
|---|---|---|---|---|
| PV FUTURE CLAIMS | $ 31,243 | $ 23,945 | | |
| TOTAL COVERED YEARS | 32 | 32 | | |
| ANNUALIZING FACTOR | 11.3436 | 11.3436 | | |
| ANNUAL PREMIUM FOR CLAIMS ONLY | $ 2,754 | $ 2,111 | | |
| PV ADMIN & FIRST YEAR EXPENSES | $ 9,360 | $ 8,170 | | |
| REVISED ANNUAL PREMIUM | $ 3,579 | $ 2,831 | | |
| GROSS UP, PROFITS & PREMIUM BASED EXPENSES | $ 4,502 | $ 3,561 | | |
| MONTHLY PREMIUM | $ 376 | $ 296 | $ 79 | 21% |

50 — Policy Year Assumptions

| POLICY YEAR | 1 | 2 | 3 | 4 | 5 | 6 | 7 | 8 | 9 | 10 |
|---|---|---|---|---|---|---|---|---|---|---|
| APPLICANT'S AGE | 35 | 36 | 37 | 38 | 39 | 40 | 41 | 42 | 43 | 44 |
| EXPECTED MORTALITY RATE | 0.045% | 0.053% | 0.059% | 0.065% | 0.069% | 0.072% | 0.076% | 0.081% | 0.085% | 0.090% |
| INFLATION FACTOR (CUMULATIVE SINCE ISSUE) | 100% | 104% | 108% | 112% | 117% | 122% | 127% | 132% | 137% | 142% |

51 — TRADITIONAL LEVEL DEATH BENEFITS

| | 1 | 2 | 3 | 4 | 5 | 6 | 7 | 8 | 9 | 10 |
|---|---|---|---|---|---|---|---|---|---|---|
| TRADITIONAL LEVEL DEATH BENEFITS | $2,650,000 | $2,650,000 | $2,650,000 | $2,650,000 | 2,650,000 | 2,650,000 | 2,650,000 | 2,650,000 | $2,650,000 | $2,650,000 |
| LAPSE RATE | 8% | 6% | 6% | 6% | 6% | 6% | 6% | 6% | 6% | 6% |
| END OF YEAR DEATH CLAIM PRE-DECREMENTS | 1,193 | 1,391 | 1,564 | 1,723 | 1,815 | 1,895 | 2,001 | 2,133 | 2,253 | 2,372 |
| PERSISTENCY WITH MORTALITY & LAPSES | 100.00% | 91.96% | 86.39% | 81.16% | 76.23% | 71.61% | 67.26% | 63.17% | 59.33% | 55.72% |
| EXPECTED DEATH CLAIM PAID AFTER DECREMENTS | 1,193 | 1,279 | 1,351 | 1,398 | 1,384 | 1,357 | 1,346 | 1,348 | 1,336 | 1,322 |
| PERSISTENCY FACTOR FOR COVERAGE PERIOD | 100.00% | 91.96% | 86.39% | 81.16% | 76.23% | 71.61% | 67.26% | 63.17% | 59.33% | 55.72% |
| PRELIMINARY ANNUAL PREMIUM COLLECTED | 2,754 | 2,533 | 2,379 | 2,235 | 2,100 | 1,972 | 1,852 | 1,740 | 1,634 | 1,535 |
| FIRST YEAR MARKETING EXPENSES & DAC TAX | 5,095 | | | | | | | | | |
| ADMINISTRATIVE EXPENSES | $ 450 | $ 143 | $ 140 | $ 137 | $ 134 | $ 131 | $ 128 | $ 125 | $ 122 | $ 119 |
| TOTAL EXPENSES | $ 5,545 | $ 143 | $ 140 | $ 137 | $ 134 | $ 131 | $ 128 | $ 125 | $ 122 | $ 119 |

52 — CUSTOM DESIGN BENEFITS

| | 1 | 2 | 3 | 4 | 5 | 6 | 7 | 8 | 9 | 10 |
|---|---|---|---|---|---|---|---|---|---|---|
| CUSTOM DESIGN BENEFITS | $2,650,000 | $2,680,000 | $2,710,000 | $2,750,000 | 2,780,000 | 2,800,000 | 2,830,000 | 2,850,000 | $2,870,000 | $2,890,000 |
| LAPSE RATE | 8% | 6% | 6% | 6% | 6% | 6% | 6% | 6% | 6% | 6% |
| END OF YEAR DEATH CLAIM PRE-DECREMENTS | 1,193 | 1,407 | 1,599 | 1,788 | 1,904 | 2,002 | 2,137 | 2,294 | 2,440 | 2,587 |
| PERSISTENCY WITH MORTALITY & LAPSES | 100.00% | 91.96% | 86.39% | 81.16% | 76.23% | 71.61% | 67.26% | 63.17% | 59.33% | 55.72% |
| EXPECTED DEATH CLAIM PAID AFTER DECREMENTS | 1,193 | 1,294 | 1,381 | 1,451 | 1,452 | 1,434 | 1,437 | 1,449 | 1,447 | 1,441 |
| PERSISTENCY FACTOR FOR COVERAGE PERIOD | 100.00% | 91.96% | 86.39% | 81.16% | 76.23% | 71.61% | 67.26% | 63.17% | 59.33% | 55.72% |
| PRELIMINARY ANNUAL PREMIUM COLLECTED | 2,111 | 1,941 | 1,824 | 1,713 | 1,609 | 1,512 | 1,420 | 1,333 | 1,252 | 1,176 |
| FIRST YEAR MARKETING EXPENSES & DAC TAX | 3,905 | | | | | | | | | |
| ADMINISTRATIVE EXPENSES | $ 450 | $ 143 | $ 140 | $ 137 | $ 134 | $ 131 | $ 128 | $ 125 | $ 122 | $ 119 |
| TOTAL EXPENSES | $ 4,355 | $ 143 | $ 140 | $ 137 | $ 134 | $ 131 | $ 128 | $ 125 | $ 122 | $ 119 |

(reference labels shown: 54, 55, 56)

| POLICY YEAR | 1 | 2 | 3 | 4 | 5 | 6 | 7 | 8 | 9 | 10 |
|---|---|---|---|---|---|---|---|---|---|---|
| APPLICANT'S AGE | 35 | 36 | 37 | 38 | 39 | 40 | 41 | 42 | 43 | 44 |
| GROSS INCOME | $ 50,000 | $ 55,000 | $ 60,500 | $ 66,550 | $ 73,205 | $ 80,526 | $ 88,578 | $ 97,436 | $ 107,179 | $ 117,897 |
| YEARS SINCE POLICY ISSUE FOR CALCULATIONS | 0 | 1 | 2 | 3 | 4 | 5 | 6 | 7 | 8 | 9 |
| YEARS UNTIL RETIREMENT | 32 | 31 | 30 | 29 | 28 | 27 | 26 | 25 | 24 | 23 |
| WORKING? | YES | YES | YES | YES | YES | YES | YES | YES | YES | YES |
| PARTNER? | YES | | | | | | | | | |
| CURRENT CHILDREN UNDER 18? | YES | YES | YES | YES | YES | YES | YES | YES | YES | YES |
| FUTURE CHILDREN? | NO | | | | | | | | | |
| CURRENT CHILDREN UNDER 18 AND FUTURE KIDS? | YES | YES | YES | YES | YES | YES | YES | YES | YES | YES |
| CURRENT CHILDREN UNDER 18 OR FUTURE KIDS? | YES | YES | YES | YES | YES | YES | YES | YES | YES | YES |
| NO KIDS NOW BUT PLANNING ON THEM? | NO | | | | | | | | | |
| NO PARTNER BUT CHILDREN (NOW OR FUTURE)? | NO | | | | | | | | | |
| PARTNER BUT NO KIDS TO PLAN FOR? | NO | | | | | | | | | |
| REFLECT NEW SAVINGS AND IRA? | YES | YES | YES | YES | YES | YES | YES | YES | YES | YES |
| ANY FAMILY EXPENSE COVERAGE? | YES | YES | YES | YES | YES | YES | YES | YES | YES | YES |

57 / 58

| EXPECTED RETIREMENT AGE | 67 | FOR CALCULATING PRESENT VALUE OF FUTURE EXPENSES AND INCOME |
|---|---|---|
| DISCOUNT RATE | 5% | |
| ELDERLY LIFE EXPECTANCY | 80 | EXPECTED END DATE OF NEEDING COVERAGE FOR ELDERLY LONG-TERM CARE |
| OTHER DEBT PAYDOWN | 5% | ASSUMED PORTION OF INCOME PAYING DOWN OTHER DEBT |

59

| | 1 | 2 | 3 | 4 | 5 | 6 | 7 | 8 | 9 | 10 |
|---|---|---|---|---|---|---|---|---|---|---|
| CHILD #1'S AGE | 5 | 6 | 7 | 8 | 9 | 10 | 11 | 12 | 13 | 14 |
| CHILD #2'S AGE | 8 | 9 | 10 | 11 | 12 | 13 | 14 | 15 | 16 | 17 |
| | | | | | | | | | | |
| MIN YEARS OF CORE INCOME DUE TO CURRENT KIDS | 13 | 12 | 11 | 10 | 9 | 8 | 7 | 6 | 5 | 4 |
| MIN YEARS OF CORE INCOME DUE TO FUTURE KIDS | 0 | 0 | 0 | 0 | 0 | 0 | 0 | 0 | 0 | 0 |
| REMAINING YEARS FOR KIDS PROTECTION | 13 | 12 | 11 | 10 | 9 | 8 | 7 | 6 | 5 | 4 |
| MINIMUM INCOME PROTECTION FOR KIDS (ANNUAL) | $ 25,000 | $ 26,190 | $ 27,438 | $ 28,744 | $ 30,113 | $ 31,547 | $ 33,049 | $ 34,623 | $ 36,272 | $ 37,999 |
| MINIMUM PROTECTION NEEDED DUE TO KIDS (PV) | $ 436,177 | $ 431,736 | $ 424,448 | $ 413,907 | $ 399,664 | $ 381,215 | $ 357,999 | $ 329,396 | $ 294,712 | $ 253,178 |

60

COVERAGE FOR INCOME PROTECTION

| | 1 | 2 | 3 | 4 | 5 | 6 | 7 | 8 | 9 | 10 |
|---|---|---|---|---|---|---|---|---|---|---|
| CORE INCOME SUPPORT | $ 25,000 | $ 27,500 | $ 30,250 | $ 33,275 | $ 36,603 | $ 40,263 | $ 44,289 | $ 48,718 | $ 53,590 | $ 58,949 |
| PRESENT VALUE FUTURE INCOME SUPPORT (ANNUAL) | $ 25,000 | $ 26,190 | $ 27,438 | $ 28,744 | $ 30,113 | $ 31,547 | $ 33,049 | $ 34,623 | $ 36,272 | $ 37,999 |
| PROTECTION NEEDED BY YEAR | $ 1,311,907 | $ 1,351,253 | $ 1,389,940 | $ 1,427,675 | $ 1,464,120 | $ 1,498,893 | $ 1,531,562 | $ 1,561,637 | $ 1,588,565 | $ 1,611,724 |

61

PARTNER LIFESTYLE PROTECTION (HOUSEHOLD SERVICES)

| | 1 | 2 | 3 | 4 | 5 | 6 | 7 | 8 | 9 | 10 |
|---|---|---|---|---|---|---|---|---|---|---|
| PROJECTED COST OF HOUSEHOLD SERVICES | $ 18,000 | $ 18,900 | $ 19,845 | $ 20,837 | $ 21,879 | $ 22,973 | $ 24,122 | $ 25,328 | $ 26,594 | $ 27,924 |
| PRESENT VALUE OF HOUSEHOLD SERVICES (ANNUALLY) | $ 18,000 | $ 18,000 | $ 18,000 | $ 18,000 | $ 18,000 | $ 18,000 | $ 18,000 | $ 18,000 | $ 18,000 | $ 18,000 |
| PROTECTION NEEDED BY POLICY YEAR | $ 576,000 | $ 585,900 | $ 595,350 | $ 604,280 | $ 612,615 | $ 620,273 | $ 627,165 | $ 633,195 | $ 638,261 | $ 642,250 |

GESTURE-ENABLED INTERFACES, SYSTEMS, METHODS, AND APPLICATIONS FOR CUSTOM DESIGNING NON-LEVEL LIFE INSURANCE BENEFITS POLICIES AND SUPPORTING CUSTOMIZED PRICING

CROSS-REFERENCE TO RELATED APPLICATIONS

This application is a continuation of U.S. patent application Ser. No. 18/199,282, filed on May 18, 2023, the contents of which are hereby incorporated by reference in their entirety for all purposes.

TECHNICAL FIELD

This disclosure is related to life insurance applications, platforms, systems, methods, and computer program products. In certain embodiments, the technologies described herein can include enhanced gesture-based functionalities and features that enable life insurance products to be rapidly created and/or edited in an intuitive manner, and allow users to simulate and create in real-time a customized benefit plan for the insured's life insurance needs with a customized price for the unique schedule of benefits requested. In some embodiments, these technologies can be optimized to facilitate rapid creation and pricing of customized life insurance products.

BACKGROUND

The life insurance industry has a long-standing practice of providing products with level death benefits even though a consumer's need for life insurance changes over time. Level death benefit products require the insured to undergo the time-consuming process of re-determining their insurance needs, applying for additional coverage when the insured's need for coverage has increased since they purchased the policy, and risk being rejected due to a change in health.

When the insured's needs for life insurance benefits are declining, the process for updating (e.g., lowering) the coverage is very inefficient. Reducing the coverage on existing term insurance policies may not be allowed by the carrier. If the reduction change is allowed, it may incur administrative fees. One attempt at serving an insured's need for decreasing coverage is decreasing term insurance policies sold with or linked to mortgages. Even these specialized policies have limited application because they usually must be purchased when the mortgage is originated so the declining benefits align with the mortgage amortization schedule.

There is a need for technology solutions to facilitate creation of a customized life insurance benefits policy whereby the future policy benefits are specific to the insured's forecasted needs (or wants) during the application and policy creation process. Consumers could enhance their life insurance protection with a customized benefit policy that establishes the change in future benefits during the application process (e.g., a fixed, non-level death benefit schedule designed for the insured's forecasted needs), thereby eliminating the time and hassle for both the insured and the insurance company's administrative staff to process applications for new coverage in the future or voluntary requests to reduce a policy's benefits.

If the insured's life insurance needs are expected to increase, a customized benefit plan could pre-set such an increase in coverage. Several categories of life insurance needs would benefit from a customized benefit method including, for example, young adults early in the child raising years, small business owners using life insurance with buy-sell agreements where life insurance is the financing tool upon the business partner's death, or life insurance targeted to cover the growing income tax liability on the insured's tax-qualified retirement account.

In many instances, the need for life insurance decreases over time. Protection for a declining mortgage or other debts is one example. As another example, older adults seeking to protect the rest of their expected income prior to retirement have a need for declining coverage over a time-period matching their planned retirement horizon. Traditional level death benefit policies will quickly result in over-insurance if the insured is relatively close to retirement.

BRIEF DESCRIPTION OF DRAWINGS

To facilitate further description of the embodiments, the following drawings are provided, in which like references are intended to refer to like or corresponding parts, and in which:

FIG. 2D is another exemplary interface illustrating user input to project a user's need for life insurance to determine benefits needed each policy year;

FIG. 9 illustrates sample calculations for the pricing engine integrated with the user interface to provide a real-time premium quote for the customized benefit plan; and FIG. 10 illustrates sample calculations for the benefit determination algorithm integrated with the user interface to determine the life insurance coverage by policy year for each category and in totality for the policy application.

Figure 1A:
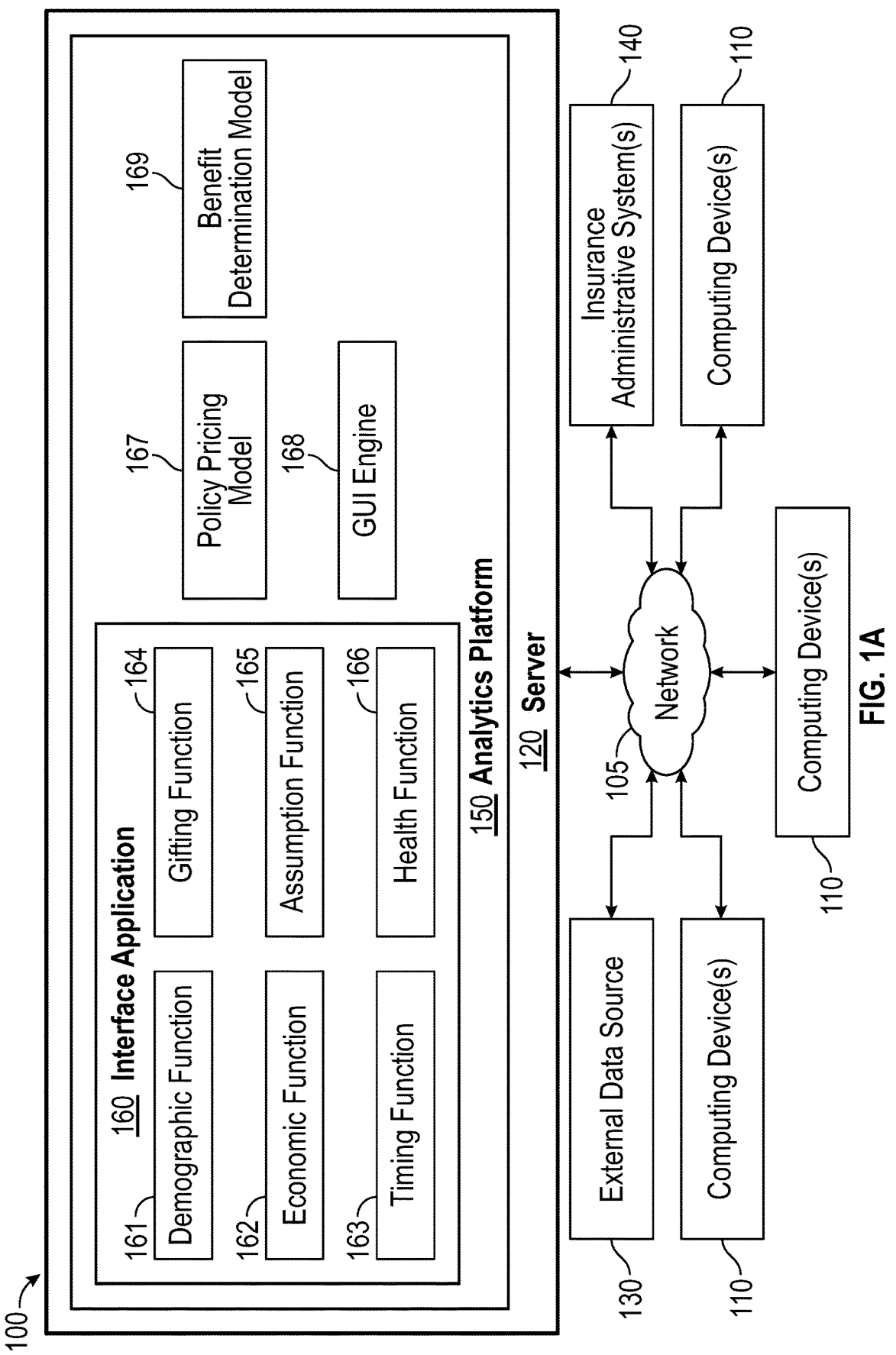
FIG. 1A is a block diagram of an exemplary system in accordance with certain embodiments.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein.

The terms "left," "right," "front," "rear," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

DETAILED DESCRIPTION OF EXEMPLARY EMBODIMENTS

The present disclosure is directed to a system to assist a potential life insurance applicant with forecasting their life insurance benefit needs until a specified date or age (such as planned retirement) and translate the projected insurance needs into a customized death benefit policy with a premium quote tailored to that unique coverage plan. Upon finalization of a coverage plan and cost that fits the applicant's needs, the user interface transmits the customized benefit schedule to the insurance carrier for underwriting, approval and administration of a policy with benefits pre-set to change for many years in the future.

The user interface includes a plurality of information requests on the insured, their life insurance objectives (e.g., which needs they wish to cover or legacy-oriented wishes), changeable assumptions that drive the projection benefit needs, system calculated and displayed life insurance needs by category and time (e.g., initial coverage needed vs. future needs).

The user interface technology is integrated with a benefit determination algorithm and a policy pricing algorithm to obtain real-time premium quotes for the customized benefit policy, supported by capabilities for the potential insured to estimate their health status prior to underwriting. Refining an insured's estimated health status enables the potential insured to determine if the customized benefit policy is affordable before submitting the policy for underwriting and approval. The interface's capability to segment projected needs by category enables the insured to adjust any coverage category and get real-time premium quote updates. Real-time interaction with the policy pricing algorithm provides the user with critical information during the customized policy design phase to balance their coverage needs with the cost and helps the insurance company avoid the expense of underwriting and processing new policy issues that could get rejected when the applicant gets the approved policy and premium requirement.

Traditional level death benefit policies are priced by underwriting risk class and issue age, effectively socializing the persistency expectations for all applicants in that class. Premium rates per 1000 of level benefits are readily available for applicants to know the cost before applying. With a customized benefit plan, "rate tables per 1000 of death benefit" are difficult to utilize because the requested policy benefits are unique to the insured. A policy pricing algorithm that determines a premium quote especially for the customized benefit plan is both necessary and beneficial to the carrier's ability to provide a more accurate premium calculation. The policy pricing algorithm is able to customize the persistency expectations to the requested plan (utilizing such information from the interface as the reason for the coverage and the pattern of death benefits), along with potentially other consumer-specific information deemed non-discriminatory by the industry regulators.

The insured's coverage and cost would be more optimized to the insured's current and future needs by pre-setting coverage increases (i.e., avoiding the time and risk of new underwriting) and decreases (i.e., avoid the hassle of submitting voluntary requests for benefit decreases). Given the limitations imposed by today's level death benefit policies, the typical life insurance needs analysis and application process either selects a single level death benefit (the most inefficient method) or a "laddering" technique that utilizes multiple term policies with staggered term lengths. The time and effort needed to figure out a combination of term policies with different level death benefits and term lengths still leaves gaps in coverage and/or over-insurance as changes in one's life insurance needs rarely decrease abruptly (e.g., what often happens to one's benefit protection when a term policy expires at the end of the level premium period).

The methods and systems disclosed herein provide administrative efficiency for the insurance company. For example, the present invention avoids additional underwriting costs and administrative processing costs when an existing policy owner applies for a new policy or increase in coverage on an existing policy. Similarly, administrative costs for handling voluntary requests for partial reduction in coverage can be avoided. The administrative system of the present invention can be programmed to automatically process the benefit changes as scheduled.

Embodiments disclosed herein are directed to a user interface that interacts with a benefit determination model that includes a benefit determination algorithm to create a customized benefit schedule to match the insured's needs, interacts with a policy pricing model that includes a policy pricing algorithm to provide a customized premium quote, and prepares a specific policy for approval submission for efficient use of time and money both during the initial application process and avoiding the hassles of making coverage changes in the future.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature and/or component referenced in this disclosure can be implemented in hardware and/or software.

Figure 1B:
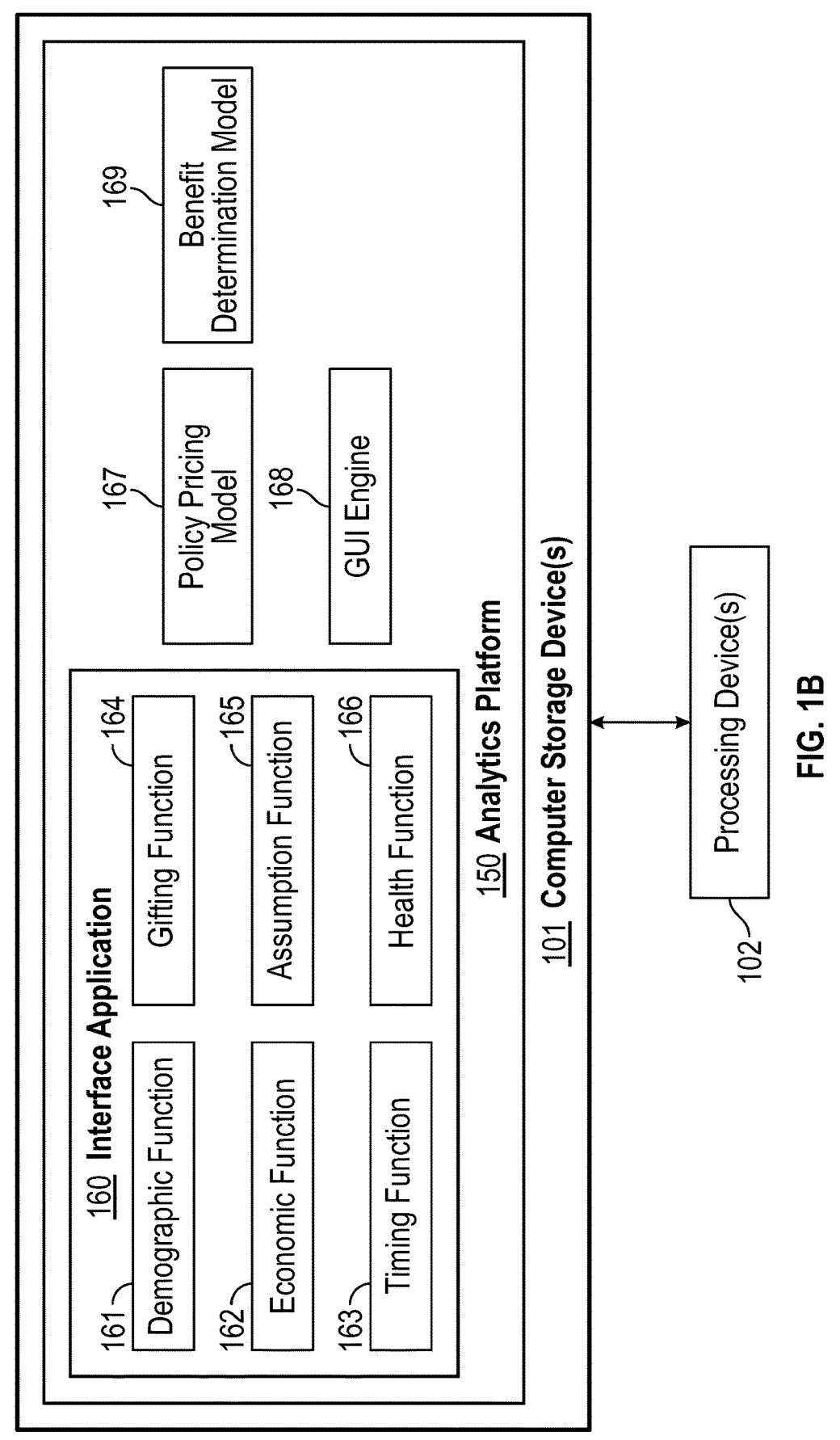
FIG. 1B is a block diagram illustrating exemplary features of an analytics platform in accordance with certain embodiments.
Figure 2A:
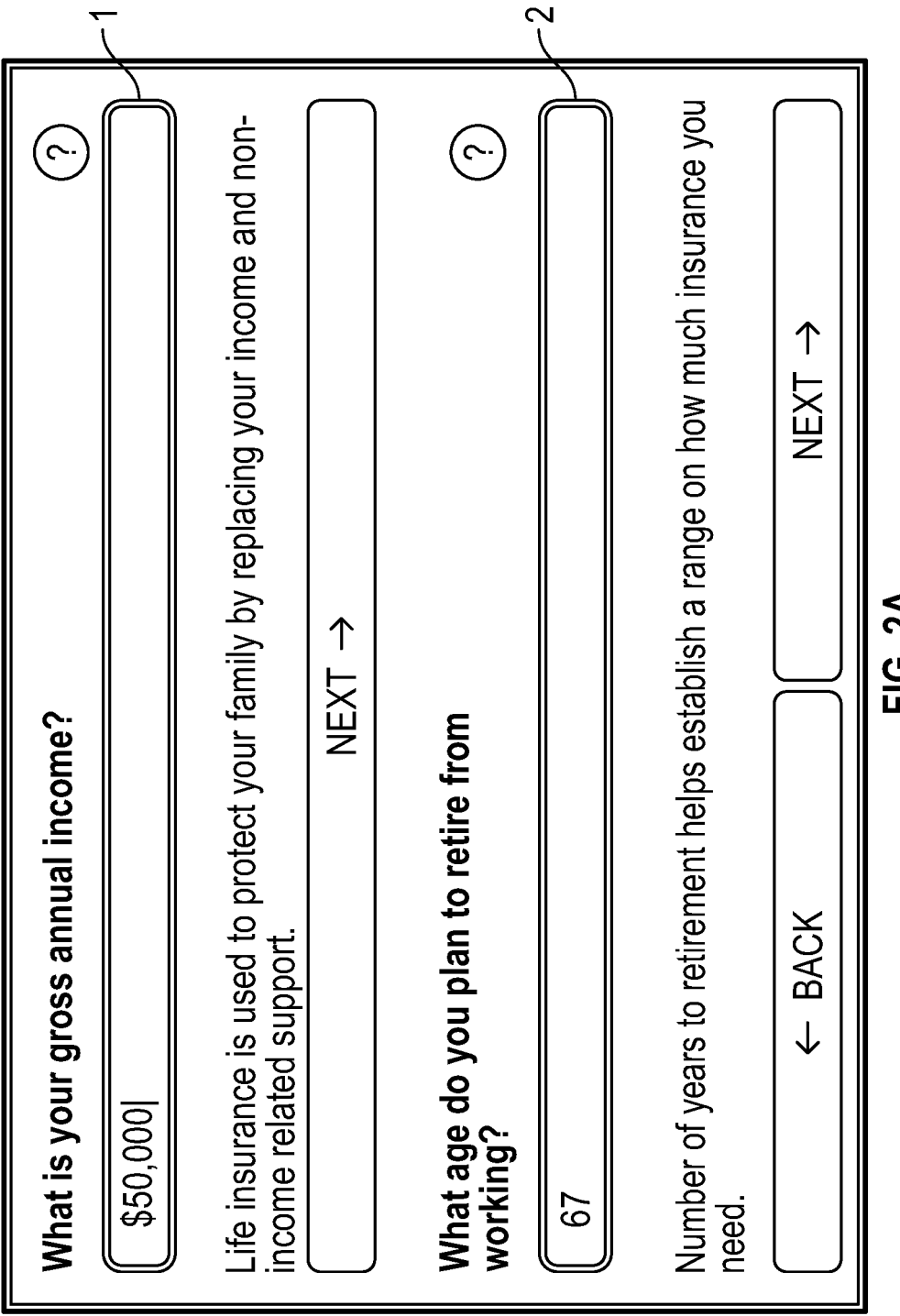
FIG. 2A is an exemplary interface illustrating user input to project a user's need for life insurance to determine benefits needed each policy year.
Figure 2B:
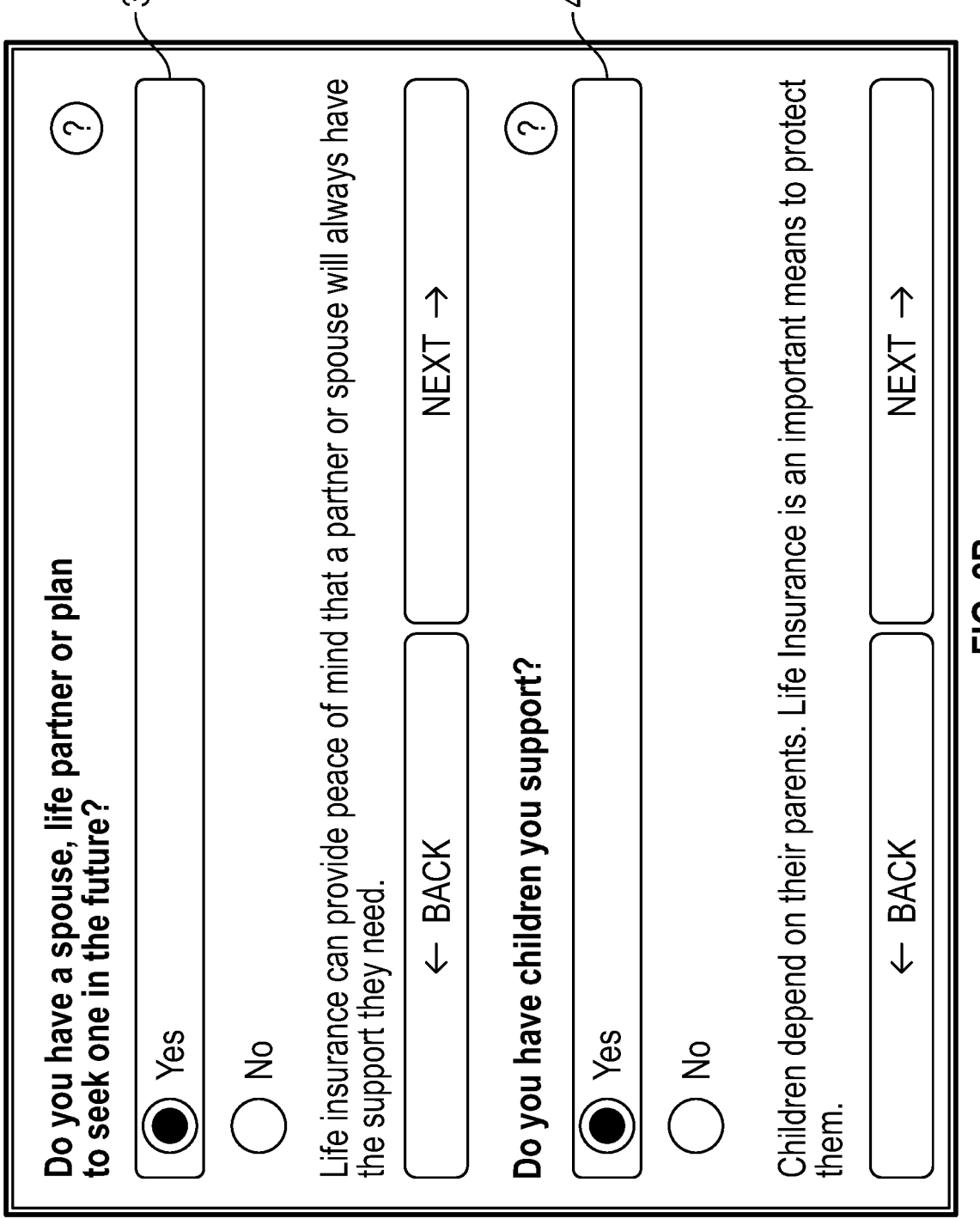
FIG. 2B is another exemplary interface illustrating user input to project a user's need for life insurance to determine benefits needed each policy year.
Figure 2C:
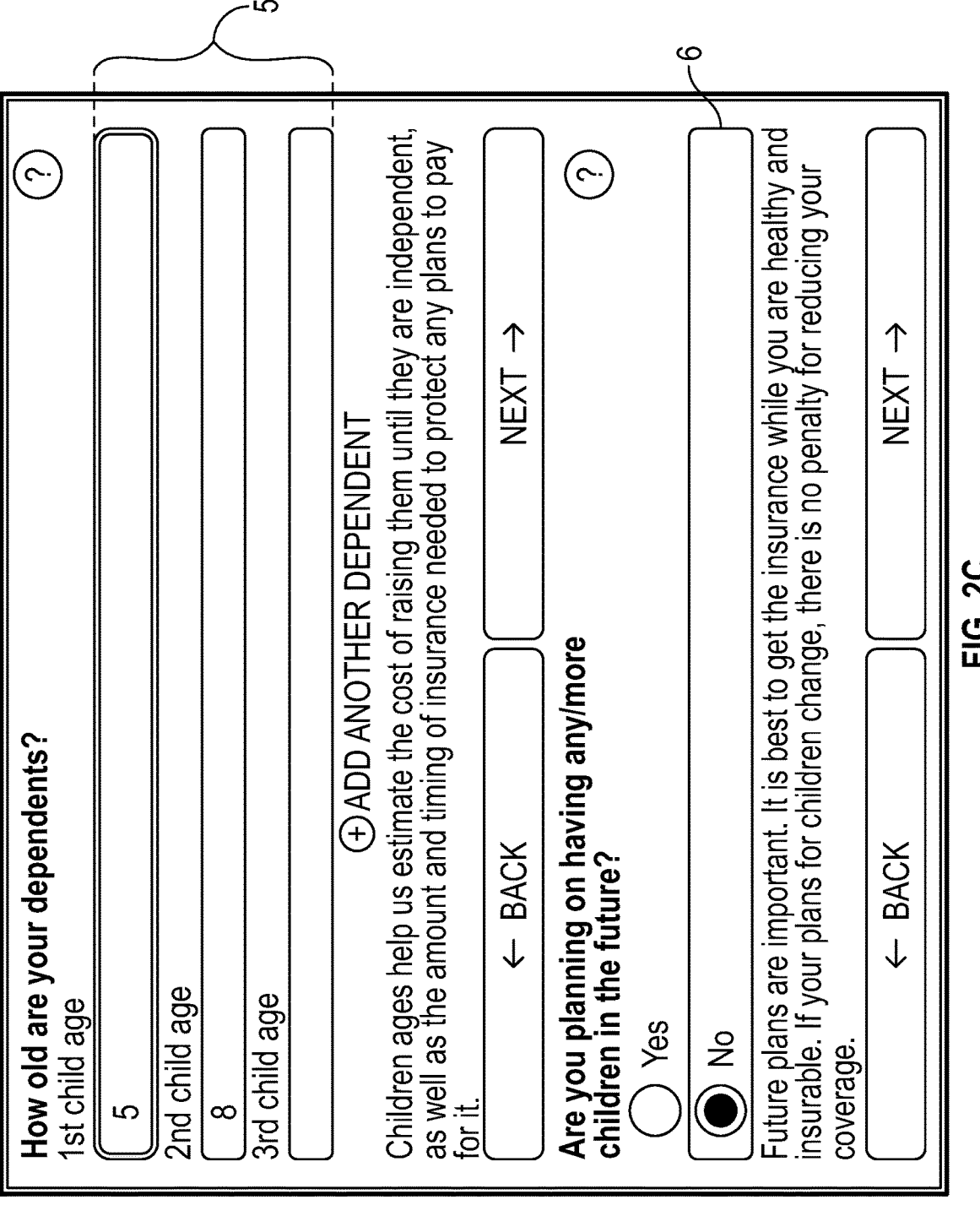
FIG. 2C is another exemplary interface illustrating user input to project a user's need for life insurance to determine benefits needed each policy year.

FIG. 1A is a diagram of an exemplary system 100 in accordance with certain embodiments that includes, inter alia, an analytics platform 150. FIG. 1B is a diagram illustrating exemplary features, components, and/or functions associated with the analytics platform 150. FIGS. 1A and 1B are jointly discussed below.

The system 100 comprises one or more computing devices 110, one or more servers 120, one or more external data sources 130, and one or more insurance administrative systems 140 that are in communication over a network 105. An analytics platform 150 is stored on, and executed by, the one or more servers 120. The network 105 may represent any type of communication network, e.g., such as one that comprises a local area network (e.g., a Wi-Fi network), a personal area network (e.g., a Bluetooth network), a wide area network, an intranet, the Internet, a cellular network, a television network, and/or other types of networks.

All the components illustrated in FIG. 1A, including the one or more computing devices 110, one or more servers 120, one or more external data sources 130, and one or more insurance administrative systems 140, and analytics platform 150 can be configured to communicate directly with each other and/or over the network 105 via wired or wireless communication links, or a combination of the two. Each of the computing devices 110, servers 120, external data sources 130, insurance administrative systems 140, and analytics platform 150 can include one or more communication devices, one or more computer storage devices 101, and one or more processing devices 102 (FIG. 1B) that are capable of executing computer program instructions.

The one or more computer storage devices 101 may include (i) non-volatile memory, such as, for example, read only memory (ROM) and/or (ii) volatile memory, such as, for example, random access memory (RAM). The non-volatile memory may be removable and/or non-removable non-volatile memory. Meanwhile, RAM may include dynamic RAM (DRAM), static RAM (SRAM), etc. Further, ROM may include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the one or more computing storage devices 101 may be physical, non-transitory mediums. The one or more computer storage devices 101 can store, inter alia, instructions associated the implementing the functionalities of the analytics platform 150 described herein.

The one or more processing devices 102 may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions. The one or more processing devices 102 can be configured to execute any computer program instructions that are stored or included on the one or more computer storage devices 101 including, but not limited to, instructions associated the implementing the functionalities of the analytics platform 150 described throughout this disclosure.

Each of the one or more communication devices can include wired and wireless communication devices and/or interfaces that enable communications using wired and/or wireless communication techniques. Wired and/or wireless communication can be implemented using any one or combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware can depend on the network topologies and/or protocols implemented. In certain embodiments, exemplary communication hardware can comprise wired communication hardware including, but not limited to, one or more data buses, one or more universal serial buses (USBs), one or more networking cables (e.g., one or more coaxial cables, optical fiber cables, twisted pair cables, and/or other cables). Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.). In certain embodiments, the one or more communication devices can include one or more transceiver devices, each of which includes a transmitter and a receiver for communicating wirelessly. The one or more communication devices also can include one or more wired ports (e.g., Ethernet ports, USB ports, auxiliary ports, etc.) and related cables and wires (e.g., Ethernet cables, USB cables, auxiliary wires, etc.).

In certain embodiments, the one or more communication devices additionally, or alternatively, can include one or more modem devices, one or more router devices, one or more access points, and/or one or more mobile hot spots. For example, modem devices may enable some or all of the computing devices 110, servers 120, external data sources 130, insurance administrative systems 140, and/or analytics platform 150 to be connected to the Internet and/or other network. The modem devices can permit bi-directional communication between the Internet (and/or other network) and the computing devices 110, servers 120, external data sources 130, insurance administrative systems 140, and/or analytics platform 150. In certain embodiments, one or more router devices and/or access points may enable the computing devices 110, servers 120, external data sources 130, insurance administrative systems 140, and/or analytics platform 150 to be connected to a LAN and/or other more other networks. In certain embodiments, one or more mobile hot spots may be configured to establish a LAN (e.g., a Wi-Fi network) that is linked to another network (e.g., a cellular network). The mobile hot spot may enable the computing devices 110, servers 120, external data sources 130, insurance administrative systems 140, and/or analytics platform 150 to access the Internet and/or other networks.

In certain embodiments, the computing devices 110 may represent desktop computers, laptop computers, mobile devices (e.g., smart phones, personal digital assistants, tablet devices, vehicular computing devices, wearable devices, or any other device that is mobile in nature), and/or other types of devices. The one or more servers 120 may generally represent any type of computing device, including any of the aforementioned computing devices 110. The one or more servers 120 also can comprise one or more mainframe computing devices and/or one or more virtual servers that are executed in a cloud-computing environment. In some embodiments, the one or more servers 120 can be configured to execute web servers and can communicate with the computing devices 110, external data sources 130, insurance administrative systems 140, and/or other devices over the network 105 (e.g., over the Internet).

In certain embodiments, the analytics platform 150 can be stored on, and executed by, the one or more servers 120. Additionally, or alternatively, the analytics platform 150 can be stored on, and executed by, the one or more computing devices 110 and/or other suitable computing devices.

In some embodiments, the analytics platform 150 also can be stored as a local application on a computing device 110, or interfaced with a local application stored on a computing device 110, to implement the techniques and functions described herein. The computing device 110 may be part of insurance administrative system 140 in some scenarios.

The insurance administrative systems 140 can generally correspond to third-party systems, networks, and/or devices that access the analytics platform 150 and/or utilize the data generated by the analytics platform 150. For example, the insurance administrative systems 140 can be operated and managed by businesses, and/or other entities that utilize the analytics platform 150 (including data generated by the analytics platform 150) to improve the functionalities of one or more systems and/or one or more applications. For example, the insurance administrative systems 140 can be an insurance carrier that utilizes the output from the analytics platform 150 to generate a customized benefit policy and premium quote for a customized life insurance benefit policy for an insured.

Each of the insurance administrative systems 140 may include one or more computing devices, such as computing devices 110, that enable the insurance administrative systems 140 to access the analytics platform 150 over the network 105. In some cases, one or more of the insurance administrative systems 140 may include sophisticated technological infrastructures, such those that include enterprise systems, servers, such as servers 120, virtual private networks (VPNs), intranets, etc. The computing devices 110, servers 120, and/or other devices associated with each insurance administrative system 140 can store and execute various applications (e.g., such as insurance products, etc.). The insurance administrative systems 140 and associated applications can leverage the data provided by the geolocation analytics platform 150 in various ways.

In certain embodiments, the analytics platform 150 can be integrated with (or can communicate with) various applications hosted by the insurance administrative systems 140 including, but not limited to, applications that provide products or services for insurance needs. In certain embodiments, the analytics platform 150 additionally, or alternatively, can be integrated with (or can communicate with) other applications. For example, servers 120 and analytics platform 150 could be hosted by a third party and interface with one or more insurance administrative systems 140 over network(s) 105.

The aforementioned applications and/or other applications, each of which may be integrated or interfaced with the analytics platform 150, can be stored on one or more insurance administrative systems 140 in some embodiments. For example, the aforementioned applications and/or other applications can be stored on one or more computing device

110 and/or one or more servers 120 associated with one or more insurance administrative systems 140.

As discussed throughout this disclosure, the analytics platform 150 can generally provide functions associated with analyzing insurance conditions associated with individuals. In certain embodiments, the analytics platform 150 is implemented with an interface application 160 that enables a user to interact with a user interface to modify functions and produce life insurance products that can be utilized with insurance administrative systems 140. The interface application 160 is utilized by a user to create a customized, non-level death benefit life insurance policy (or term insurance rider attached to a traditional permanent life insurance policy) where the death benefits automatically change periodically, up or down without new underwriting, according to a customized schedule, and providing a premium quote for the customized benefit policy. The interface application 160 can facilitate a user interface displaying a plurality of functions for a prospective insured to create a personal profile of their personal situation, family status and various categories that impact the insured's need for life insurance, assumptions that determine the current and future death benefit needs, wherein the input fields may be numbers, tables, formulas, or data relationship components.

In the illustrated embodiments, the interface application 160 comprises a demographic function 161, an economic function 162, a timing function 163, a gifting function 164, an assumption function 165, and a health function 166. In the illustrated embodiment, the analytics platform 150 includes a graphical user interface (GUI) engine 168 that coordinates the inputs from the interface application with a policy pricing model 167, and a benefit determination model 169.

In certain embodiments, policy pricing model 167 and/or benefit determination model 169 could be implemented as separate algorithms, modules, components, spreadsheets, or any other suitable computer application or software and interface with the GUI engine 168 and/or interface application 160, such as via application programming interfaces (APIs). Alternatively, or additionally, policy pricing model 167 and/or benefit determination model 169 could be implemented together with or as part of GUI engine 168 and/or interface application 160. In certain embodiments, policy pricing model 167 and benefit determination model 169 could be implemented together as a single model.

The demographic function 161 corresponds to the insured's demographic factors that impact the projected need for life insurance benefits including but not limited to current age, planned retirement date, spousal status, and children status. The demographic function 161 can be displayed on a GUI via the GUI engine 168 to enable a user to modify information related to the demographic function 161.

The economic function 162 corresponds to the insured's economic situation that impacts the need for life insurance benefits such as current income, mortgage balances, other debts and their respective amortization schedules, savings and retirement account balances, and existing life insurance coverage. The economic function 162 can be displayed on a GUI via the GUI engine 168 to enable a user to modify information related to the economic function 162.

The timing function 163 corresponds to the amount and timing of life insurance benefit needs impacted by the ages of the children, college tuition support plans, children with special needs, elderly parents needing (or will need) long-term care and/or other financial support. The timing function 163 can be displayed on a GUI via the GUI engine 168 to enable a user to modify information related to the timing function 163.

The gifting function 164 corresponds to the insured's desire for life insurance benefits considered a gift to a beneficiary rather than meeting a need for life insurance triggered by the insured's death. Examples of gifting-driven life insurance include benefits intended for charitable organizations, non-immediate family members, friends or tax-qualified retirement account beneficiaries inheriting income tax liabilities. The gifting function 164 can be displayed on a GUI via the GUI engine 168 to enable a user to modify information related to the gifting function 164.

The assumption function 165 corresponds to adjustable fields on the plurality of assumptions used by the benefit determination algorithm such as expenses for burial services, household support, childcare, long-term health care, college tuition, and inflation rates for each category. In some embodiments, the assumption function can also correspond to adjustable fields on the plurality of assumptions used by the algorithm to project future gross income, portion of gross income to provide insurance coverage, savings and retirement account contribution rates, investment returns, and other factors that impact the current and future amount of life insurance needed or desired by the insured. The assumption function 165 can be displayed on a GUI via the GUI engine 168 to enable a user to modify information related to the assumption function 165.

The health function 166 corresponds to estimating the insured's health status, wherein the health function includes displaying underwriting class input fields such as age, gender, smoker status, and general health assessment fields with computer-assisted definitions to assist the proposed insured in estimating a health underwriting class. The health function 166 can be displayed on a GUI via the GUI engine 168 to enable a user to modify information related to the health function 166.

The benefit determination model 169 can utilize the information from the demographic function 161, the economic function 162, the timing function 163, the gifting function 164, the assumption function 165, and/or the health function 166 to determine the projected life insurance benefits needed as the insured ages and discount the future benefits needed from each age to determine each policy year's life insurance benefits needed, and adjust the customized life insurance benefit policy for projected assets and existing coverage the insured plans to retain, if desired by the insured. In some embodiments, the benefit determination model 169 can be implemented in accordance with the methods illustrated in FIG. 10. In some embodiments, the policy pricing model 167 can utilize the information from the demographic function 161, the economic function 162, the timing function 163, the gifting function 164, the assumption function 165, and/or the health function 166 to determine a premium quote for the customized benefit policy requested. In some embodiments, the policy pricing model 167 determines a premium quote for a customized benefit policy based on the methods illustrated in FIG. 9.

The GUI engine 168 displays the demographic function 161, the economic function 162, the timing function 163, the gifting function 164, the assumption function 165, and/or the health function 166 to a user, such as shown in the exemplary embodiments illustrated in FIGS. 2-8. In some embodiments, the GUI engine 168 displays the customized benefit policy numerically, graphically, or other means by needs category and/or in totality, and provides adjustable input fields to change the coverage on any category or multiple categories, or revise any input field, and receive real-time changes in the customized benefit policy and a premium quote. In some embodiments, the GUI engine 168 enables the insured to simulate and evaluate, in real-time, different inputs and forecasting assumptions that determine the insured's current and future benefit needs and view, in real-time, the customized benefit policy and the customized premium quote estimate, enabling the insured to optimize the protection and cost of the life insurance over many years, avoid the extra cost and time inefficiency of purchasing multiple policies of varying amounts and maturity dates to fit their projected changing benefit needs, avoid the time and risk of applying for additional benefits in the future when it is forecastable, and eliminate the hassle and administrative expense associated with voluntary benefit reductions when it is forecastable. In some embodiments, the GUI engine 168 submits a formal application for the customized life insurance benefit policy to a third-party system (e.g., insurance administrative system 140) associated with an insurance carrier in response to receiving a customized benefit policy and premium quote through the GUI engine 168.

In some embodiments, users or operators may utilize various gestures to make selections and provide inputs via the GUI engine 168. Other input mechanisms (e.g., mouse devices, keyboards, input buttons, etc.) also may be utilized to make selections and provide inputs.

In certain embodiments, the GUI engine 168 can include both a display (e.g., an LCD or liquid crystal display) device and capacitive sensing medium that is configured to detect touches and gestures. In some cases, the capacitive sensing medium can be configured to detect the location where the touch screen display is engaged or touched by an object (e.g., a user's figurer or stylus), the time and duration of each engagement or touching of the touch screen display, and/or the pressure exerted each instance the touch screen display is engaged or touched.

The capacitive sensing medium also can generate signals indicating the same. The capacitive sensing medium can include one or more sensors that utilize capacitive sensing, resistive sensing, surface acoustic wave sensing, strain gauges, force sensitive resisters, load cells, pressure plates, piezoelectric transducers, and/or the like to detect the aforementioned parameters.

The capacitive sensing medium can be configured to detect various types of gestures. Exemplary gestures that may be utilized to provide inputs via the capacitive sensing medium and/or touch screen displays of the GUI engine 168 can include:

(1) Tap Gestures: Touch or tap one finger on the touch screen display.

(2) Touch and Hold Gestures: Touch the touch screen display and hold in place for a predetermined period of time (e.g., 1-3 seconds).

(3) Swipe Gestures: Touch the touch screen display, and move or drag a finger in a direction across touch screen display.

(4) Scroll Gestures: Move or drag one finger across the touch screen display without lifting, and capable of moving bi-directionally (e.g., up and down or side to side).

(5) Zoom Gestures: Place two fingers on the touch screen display near each other and spread them apart to zoom in, or move them toward each other to zoom out.

Other types of gestures also may be utilized to provide inputs and selections via the GUI engine 168. It should be understood that any portion of this disclosure that describes selections, inputs, or the like being received on an interface can be provided by usage of one or more of the aforementioned gestures.

FIGS. 3-8 illustrate exemplary user interface outputs that can be generated by the GUI engine 168. References to a user interface refer to the operation of the GUI engine 168.

FIGS. 2A, 2B, 2C and 2D illustrate sample user interface inputs that are input into at least one of the benefit determination model 169 or the policy pricing model 167 to project the insured's life insurance benefit needs years into the future and translates the projected needs into a customized coverage plan. Item 1 requests annual income on the insured with computer-assisted definitions on the data being requested along with explanations how life insurance protects that need. Item 2 inquires about the insured's expected retirement age. Item 3 seeks information on the insured's current or expected spousal status. Item 4 begins the process of learning about the insured's children status. If the answer to item 4 is 'yes', the user interface moves to item 5 regarding the children's ages, a key variable in projecting how the benefit needs change each year going forward. Item 6 provides an advanced question; seeking information on future children plans. If the user answers item 6 'yes', the system asks for quantification of how many additional children are planned to enable the algorithm to better estimate the future insurance protection needed. Item 7 inquires about the level of college education planned for their children, if any, to better estimate the amount of life insurance needed.

Figure 3:
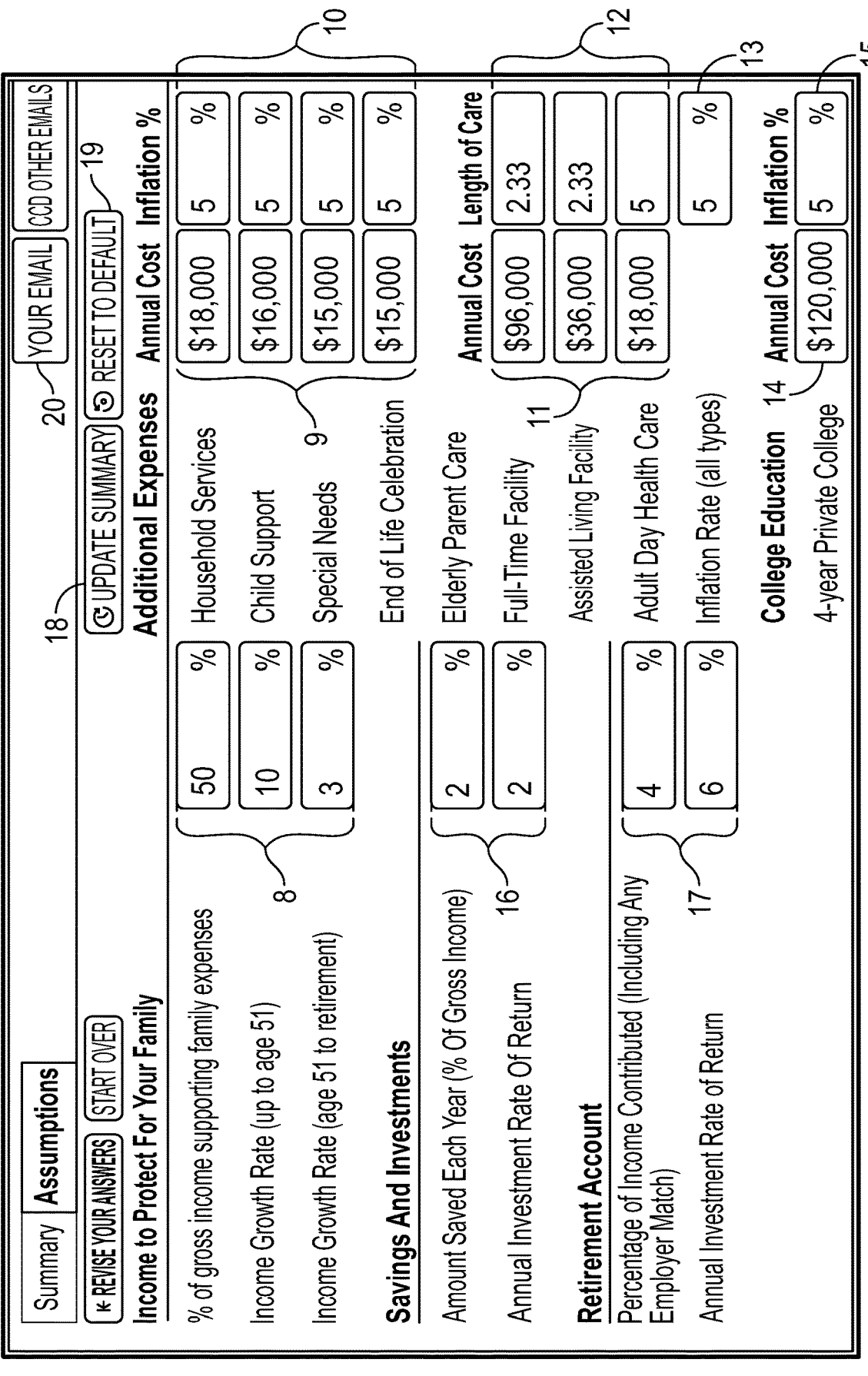
FIG. 3 illustrates a dashboard including functions a user can modify to tailor the life insurance needs projection to their situation and/or expectations.

FIG. 3 illustrates a sample user interface dashboard of assumptions used by the benefit determination model 169 to determine the year-by-year life insurance benefits in the customized plan. The system provides default assumptions for every input field and these default assumptions may be overridden by the user (e.g., by inputting different amounts) and the system will automatically regenerate a new customized benefit plan. For example, item 8 references the variables used to project the insured's future income and what portion of the income to cover with life insurance benefits (e.g., allowing for recognition of taxes and self-maintenance expenses that go away upon the insured's death). While the example related to item 8 (and the other input fields in FIG. 3) is shown as a simple input field, the user interface could be programmed with more sophisticated capabilities such as formulas, tables, relational data fields, etc.

Continuing with FIG. 3, item 9 relates to various family expense categories that may need to be covered upon the insured's death. The benefit determination model 169 uses the insured's specific family status to determine which categories apply and furthermore uses the inflation assumptions in item 10 to project the expenses into the future to determine current and future life insurance benefit needs. Similarly, items 11 through 13 relate to projecting long-term care expenses for elderly parents for whom the insured plans to provide financial support via life insurance benefits in the event of the insured's death. Items 14 and 15 provide input for projecting future college tuition expenses and life insurance benefits to cover (input fields for public schools and their association tuition and inflation rates not shown in this exhibit).

Projecting life insurance benefit needs is a capital needs analysis whereby the insured's assets are an offset to the insurance needed. Items 16 and 17 provide input fields to customize the insured's expected contributions to their savings and retirement accounts and expected investment returns.

Once the user has updated the input assumptions, clicking item 18 instructs the user interface's benefit determination algorithm to update the calculated benefits needed and displayed in the Summary page (illustrated in FIGS. 4 through 8). Item 19 provides the user the ability to reset all the assumptions to the system defaults. Item 20 provides the user the ability to email the assumption dashboard to the user and/or a third party for review and assistance.

FIGS. 2A, 2B, 2C, 2D, and 3 illustrate examples of the types of information and assumptions that can be requested from and/or displayed to users through graphical user interface 168, and it will be appreciated that various additions and/or changes could be made to the graphical user interface in accordance with the present invention. For example, the information requested from users (e.g., as shown in FIGS. 2A, 2B, 2C, 2D) could include various other types of information related to the insured. As another example, many other types of assumptions and/or information (besides the examples depicted in FIG. 4) or more or less sophisticated or granular assumptions and/or information, could be included in the graphical user interface 168. As yet another example, as an alternative or in addition to the simple input boxes shown in FIGS. 2A, 2B, 2C, 2D, and 3, any suitable types and combinations of input fields or other mechanisms (e.g., voice inputs and outputs) could be used with graphical user interface 168. These examples and numerous other variations will be readily apparent to and easily implemented by a person of ordinary skill in the art.

Figure 4:
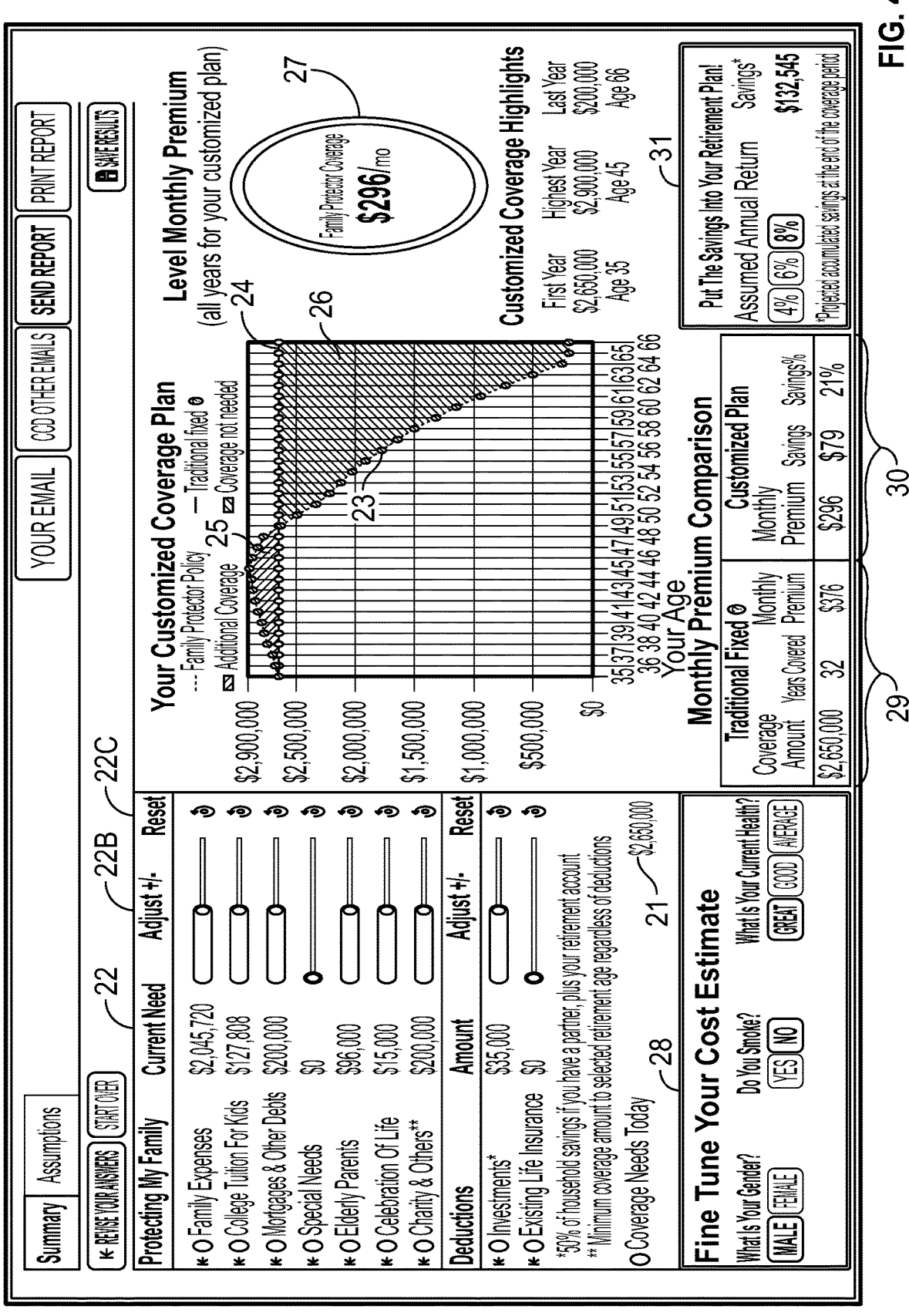
FIG. 4 illustrates an exemplary user interface output providing details of the customized benefit plan, premium quote for the estimated health status, and savings compared to a traditional level benefit policy.

FIG. 4 provides a sample user interface output displaying the insured's customized benefits needed in the first policy year, broken down by category, with a graphical display of the policy's future benefits rising and/or falling depending on that insured's specific needs, categories covered, and the plurality of assumptions from FIG. 3 as determined by the benefit determination model 169. Furthermore, the Summary page provides a monthly premium quote for the customized coverage plan and comparison information to a traditional level benefit plan for the same coverage period as determined by the policy pricing model 167.

Item 21 in FIG. 4 references the total coverage needed in the first policy year, including deductions for offsets such as investments and existing life insurance, with the total rounded. Item 22 references the system's calculated coverage needed in the first policy year by category (not rounded). Item 22B references adjustment sliders for each category, providing the user the ability to increase or decrease the coverage for any need and get real-time updates on the corresponding changes to the overall coverage plan and premium quotes. Item 22C provides reset buttons to change the coverage back to the system recommendation.

Items 23 through 26 reference key sections of the graphical display of the customized coverage plan for all years in the requested policy. The curved line referenced by item 23 is the insured's benefits for the requested policy, starting out at $2,650,000 in the first year and then increasing for several years before beginning a gradual decline. Item 24 graphically shows the level benefits offered by traditional plans (if there is a traditional plan that exactly expires when the customized plan expires). Item 25 highlights the years where the insured has additional coverage due to rising needs (vs. the traditional level plan). Item 26 highlights the years where the insured's needs are projected to decline and present cost savings opportunities. Said another way, item 26 represents the years where the insured would be over-insured with a level benefit policy.

Item 27 displays the customized premium quote for the benefits represented by item 23, using health status inputs from item 28. Item 29 provides comparative cost information for the level benefit line (item 24) vs. the customized policy information (item 30). Finally, item 31 provides the user with information on the long-term value of the overall net cost savings each month, accumulating the difference in monthly premium at the user selected investment return (4%, 6%, and 8% options in this example) up to the end of the coverage period.

Figure 5:
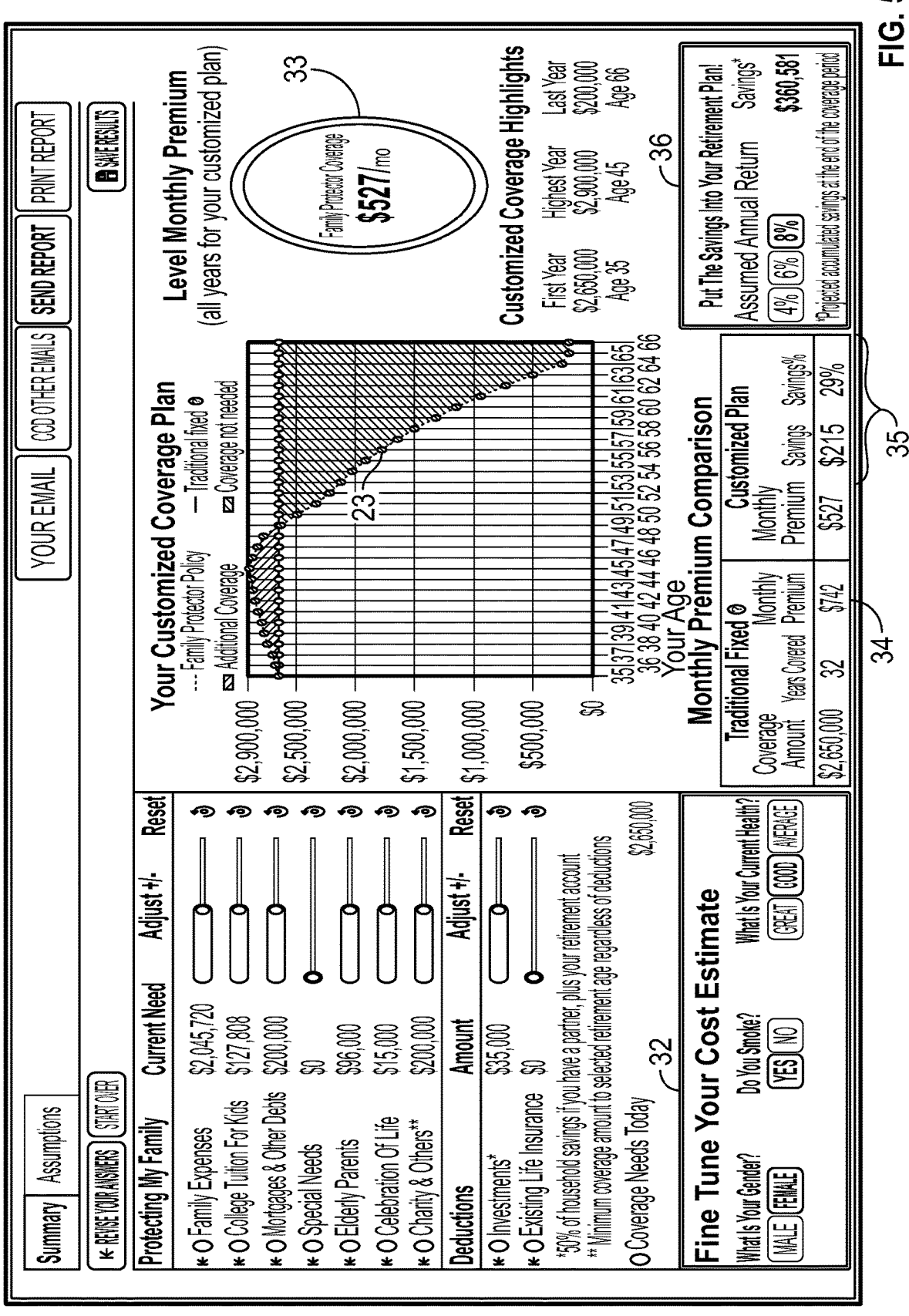
FIG. 5 illustrates a customized benefit policy and premium quote similar to FIG. 3 with different health status input.

FIG. 5 is similar to FIG. 4 except the user changed their demographics and health status in item 32. The benefits in item 23 have not changed from FIG. 4. The user interface provides real-time updates to the estimated premium (item 33), with comparative cost information in items 34 through 36 updated in real-time. This user interface's real-time correspondence with the policy pricing model 167 allows the insurance applicant to evaluate trade-offs in cost and benefits for their customized plan before submitting the policy for formal approval, saving the insurance company from wasteful administrative expense underwriting and processing applications that ultimately get rejected by the applicant because the requested plan was unaffordable.

Figure 6:
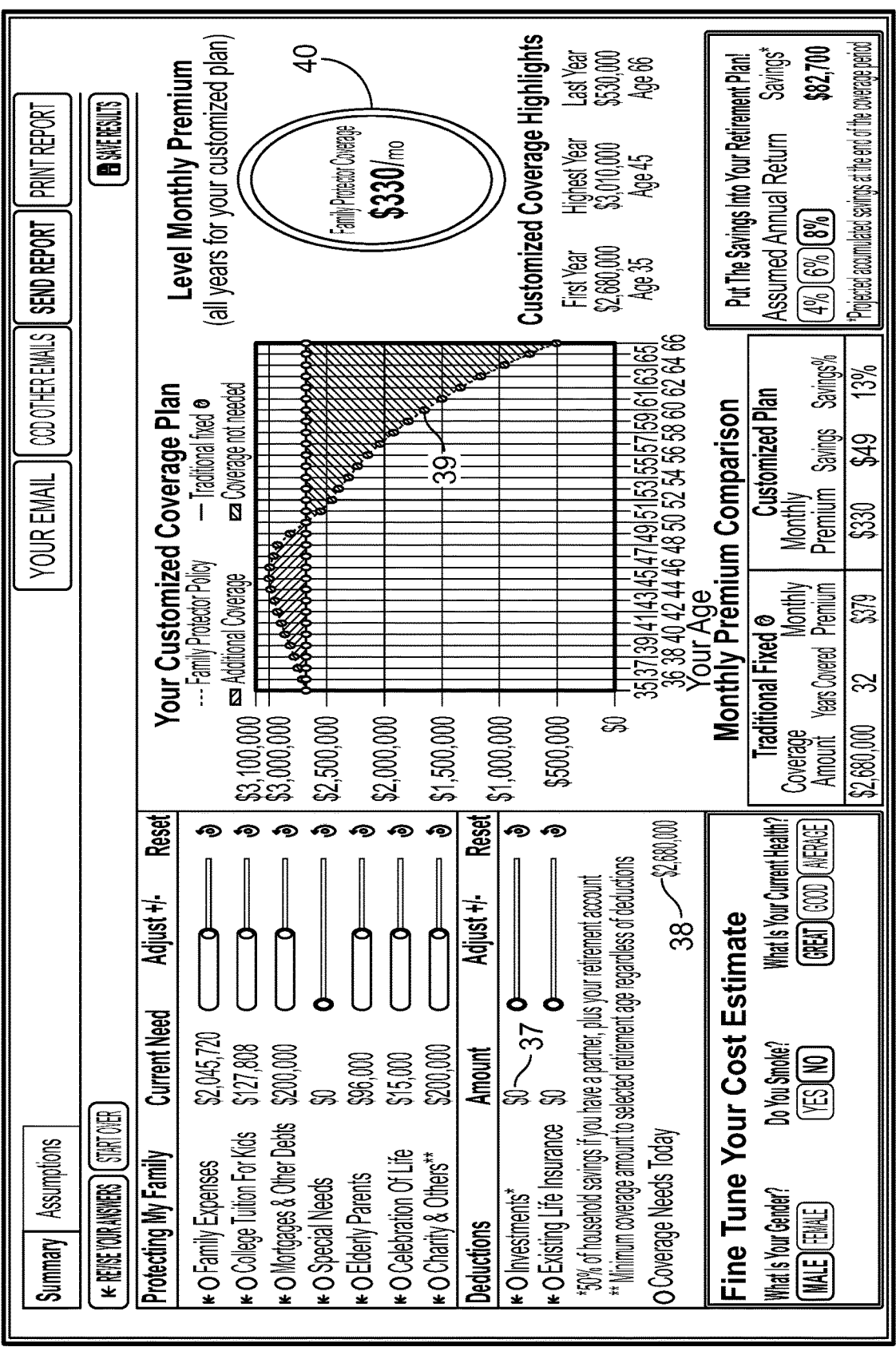
FIG. 6 illustrates a customized benefit policy and premium quote similar to FIG. 3 with deductions for projected investments turned off.

FIG. 6 is similar to FIG. 4 except it illustrates the user evaluating the impact the projected investment deductions had on the current and future benefits, and the associated monthly premium. For users with relatively large initial assets, or expectations about future income saved and/or investment returns, this user interface flexibility allows the insured to better understand the sensitivity of this assumption on the future coverage. Item 37 shows the user activating the slider to turn off the investment deductions. Item 38 is the revised initial year of coverage. Item 39 is the revised benefits by policy year without any impact from the projected investments. Item 40 shows the revised monthly premium quote, an increase from the quote in FIG. 4 due to the increased coverage plan.

Figure 7:
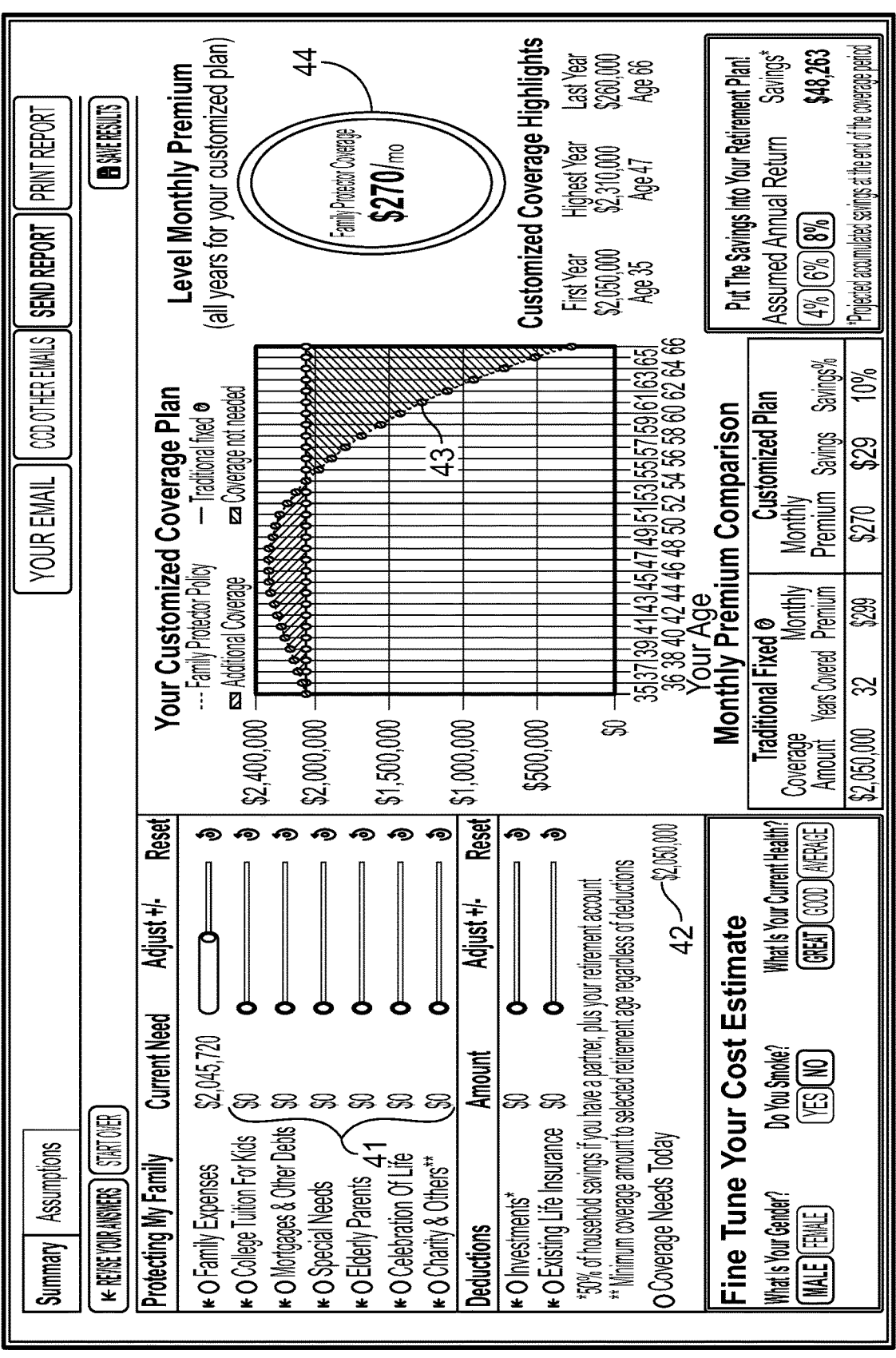
FIG. 7 illustrates a customized benefit policy and premium quote similar to FIG. 3 except coverage needs are turned off except the coverage needed to protect the insured's family expenses.

FIG. 7 is similar to FIG. 4 except it illustrates the user's ability to evaluate the coverage plan recommended for a particular category (family expenses in this example, which represents the portion of projected income covered as well as household expenses and childcare costs that a surviving spouse would need support in the event of the insured's death). Item 41 shows all the other categories being set to zero using the adjustment sliders. Item 42 is the isolated category's total first year coverage, rounded. Item 43 is the customized benefits, by policy year, for the family expense category isolated, showing the more dramatic rise in protection needed for many years before declining rapidly as the insured's stated retirement age approaches. Item 44 shows the real-time pricing algorithm's monthly premium quote for all the years covered by the benefits represented by item 43.

Figure 8:
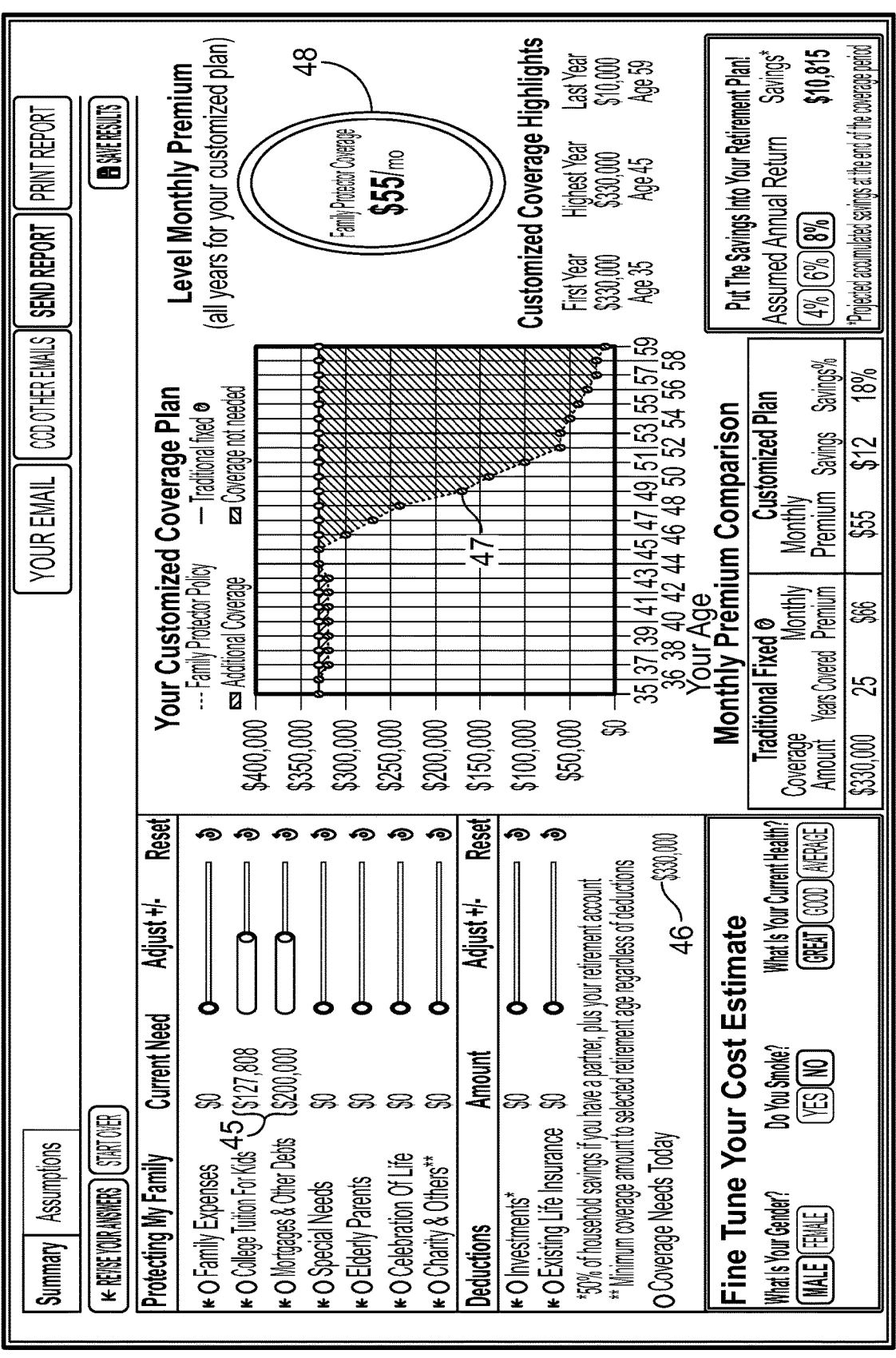
FIG. 8 illustrates a customized benefit policy and premium quote similar to FIG. 3 except the coverage is limited to the insured's protection for college tuition and mortgage.

FIG. 8 is similar to FIG. 4 except it illustrates an insured evaluating a customized life insurance policy only for two categories of needs: covering college tuition for their children and paying off the mortgage (item 45). Item 46 references the first-year coverage for the two categories covered, rounded. Item 47 graphically represents the unique benefit plan, by policy year, staying relatively level for several years before beginning a rapid decent in benefits needed. Item 48 shows the monthly premium quote for the benefit plan in item 47.

FIGS. 4-8 illustrate an example of the types of information that could be displayed and interacted with through graphical user interface 168, and it will be appreciated that various additions and/or changes could be made to the graphical user interface in accordance with the present invention. For example, the sliders depicted in item 22B of FIG. 4 could be replaced with simple input boxes (e.g., allowing the user to input a specific amount), or any other suitable type of input field. As another example, the demographic and health input section shown in item 28 of FIG. 4 could include different or additional fields or parameters relating to the insured, such as more detailed inputs regarding the insured's health. As yet another example, the information shown in items 23-27 of FIG. 4 could be output using any suitable graphical models or outputs, such as a bar chart, pie graph, or the like. These examples and numerous other variations will be readily apparent to and easily implemented by a person of ordinary skill in the art.

FIG. 9 illustrates an exemplary portion of the policy pricing model 167 integrated with the customized benefit plan to be able to provide a real-time quote. Item 49 references the pricing assumptions related to expenses and investment yield assumptions. Item 50 references the expected mortality rate and cumulative inflation factor on insurance company expenses by policy year. Item 51 references the various calculations and assumptions by policy year to determine an estimate for the monthly premium on the traditional level benefits method. Item 52 references the yearly death benefits being priced (level in this case). Item 53 references similar calculations as item 51 for the customized benefits, with item 54 referencing the non-level death benefits being priced. Finally, at the top of FIG. 9 is a summary table of the consolidating factors used to determine the monthly premium quote for the fixed/level coverage (item 55) and the customized benefit plan (item 56) which are submitted to the user interface.

FIG. 10 illustrates a portion of the benefit determination algorithm 169 integrated with the user interface to project the future amount of life insurance benefits by category, and discount the future amount needed to determine the amount of benefits needed by policy year. The example on FIG. 10 shows the first 10 policy years for a couple of selected categories to demonstrate the process. Item 57 references basic items such as the insured's age by policy year and how many years remaining until the retirement age goal. Item 58 identifies the various combinations of family status situations that the algorithm factors into the calculations, such is whether the insured has a partner/spouse, children under 18 at any given policy year, planning on future children. Item 59 identifies selected assumptions that impact the benefit calculation such as the expected retirement date input by the insured and the discount rate used to determine each year's benefit amount needed to cover future obligations. Items 60 through 62 show three selected categories of coverage calculations. Item 60 identifies the ages of the current children and resulting minimum amount of life insurance needed to replace the insured's covered income until the children are independent adults. This category is particularly relevant if the insured has dependent children but no partner/spouse and no plans of having any spouses in the future. Item 61 shows the projection of the insured's income that needs protected for the partner/spouse until the insured's stated retirement age. While the algorithm's default is to provide protection of the insured's projected income until retirement, the user interface allows for changing the amount of protection. Item 62 provides yearly detail on the projected cost of household services support to maintain the surviving partner/spouse's lifestyle and the resulting amount of insurance benefits needed by policy year. If the inputs in item 58 noted no current or future partner/spouse plans, the coverage in item 62 would be nullified.

Once the policy is submitted for approval by the insured, the insurance company underwrites the insured's health status to determine the expected mortality rate in item 50. The policy pricing algorithm in FIG. 9 is updated to finalize the premium quote.

As evidenced by the disclosure herein, the inventive techniques set forth in this disclosure are rooted in computer technologies that overcome existing problems in known insurance applications. The technologies described in this disclosure provide a technical solution for overcoming the aforementioned limitations (as well as other limitations) associated with known techniques and systems. In many cases, the technologies provide improved user input mechanisms (e.g., including the multi-gesture functionality described above) and specially configured interfaces that allow for rapid entry of information. Additionally, the technologies encompass the integration of financial needs analysis and planning directly into a life insurance protection policy that corresponds to insured and/or potential insured individuals, supported by technologies providing premium quotes for that unique policy. This technology-based solution marks an improvement over existing systems for these and other reasons.

As described above, the interface applications can present specially configured interfaces that present selection options directly on a graphical user interface. The interface applications also can be configured with improved gesture-based functionalities that facilitate rapid entry and customization of insurance information via touch screen input devices.

In certain embodiments, a system for creating a customized, non-level death benefit life insurance policy (or term insurance rider attached to a traditional permanent life insurance policy) wherein the death benefits automatically change periodically, up or down without new underwriting, according to a customized schedule, and providing a premium quote for the customized benefit policy is disclosed. The system can include: a user interface displaying a plurality of functions for a prospective insured to create a personal profile of their personal situation, family status and various categories that impact the insured's need for life insurance, assumptions that determine the current and future death benefit needs, wherein the input fields may be numbers, tables, formulas, or data relationship components, the one or more functions including at least one of the following; a first function corresponding to the insured's demographic factors that impact the projected need for life insurance benefits including but not limited to the insured's current age, planned retirement date, spousal status, and children status; a second function corresponding to the insured's economic situation that impacts the need for life insurance benefits such as current income, income growth rate expected, mortgage balances, other debts and their respective amortization schedules, savings and retirement account balances, and existing life insurance coverage; a third function corresponding to the insured's family situation that impacts the amount and timing of life insurance benefit such as the ages of the children, college tuition support plans, children with special needs, elderly parents needing (or will need) long-term care and/or other financial support; a fourth function corresponding to the insured's desire for life insurance more considered as "wishes" and not "needs" such as death benefits designated for charitable organizations, friends or beneficiaries inheriting income tax liabilities embedded with inherited tax-qualified retirement accounts; a fifth function corresponding to adjustable fields on the plurality of assumptions used by the benefit determination model such as expenses for burial services, household support, childcare, long-term health care, college tuition, and inflation rates for each category; a sixth function corresponding to adjustable fields on the plurality of assumptions used by the benefit determination model to project future gross income, portion of gross income to provide insurance coverage, savings and retirement account contribution rates, investment returns, and other factors that impact the current and future amount of life insurance needed or desired by the insured; a seventh function corresponding to estimating the insured's health status, wherein the seventh function includes displaying underwriting class input fields such as age, gender, smoker status, and general health assessment fields with computer-assisted definitions to assist the proposed insured in estimating a health underwriting class so the policy pricing model can better estimate the premium quote; in response to the insured interacting and completing the first, second, third, fourth, fifth and sixth functions, the user interface engages the benefit determination model to determine the projected life insurance benefits needed or desired as the insured ages and discounts the future benefits from each age to determine each policy year's life insurance benefits, and adjusts the customized life insurance benefit policy for projected assets and existing coverage the insured plans to retain, if desired by the insured, to determine the final customized policy's benefit schedule each policy year until scheduled expiration; in response to the system determining the customized benefit policy and the insured interacting with the seventh function, the system engages the policy pricing model to determine a premium quote for the customized benefit policy requested; the user interface displays the customized benefit policy numerically, graphically, or other means by needs category and/or in totality, and provides adjustable input fields to change the coverage on any category or multiple categories, or revise any input field, and receive real-time changes in the customized benefit policy and a premium quote; wherein, the first function, second function, third function, fourth function, fifth function, and/or sixth function of the user interface enable the insured to simulate and evaluate, in real-time, different inputs and forecasting assumptions that determine the insured's current and future benefit needs and view, in real-time, the customized benefit policy and the customized premium quote estimate, enabling the insured to optimize the protection and cost of the life insurance over many years, avoid the extra cost and time inefficiency of purchasing multiple policies of varying amounts and maturity dates to fit their projected changing benefit needs, avoid the time and risk of applying for additional benefits in the future when it is forecastable, and eliminate the hassle and administrative expense associated with voluntary benefit reductions when it is forecastable; and in response to receiving a customized benefit policy and premium quote through the user interface, the system submits a formal application for the customized life insurance benefit policy to a third-party system associated with an insurance carrier.

Embodiments disclosed herein facilitate creation of a customized life insurance benefits policy whereby the future policy benefits are specific to the insured's forecasted needs (or wants) during the application and policy creation process. Embodiments disclosed herein enabled consumers to enhance their life insurance protection with a customized benefit policy that establishes the change in future benefits during the application process (e.g., a fixed, non-level death benefit schedule designed for the insured's forecasted needs), thereby eliminating the time and hassle for both the insured and the insurance company's administrative staff to process applications for new coverage in the future or voluntary requests to reduce a policy's benefits.

If the insured's life insurance needs are expected to increase, a customized benefit plan can be pre-set such an increase in coverage. Several categories of life insurance needs benefit from the customized benefit method disclosed herein including, for example, young adults early in the child raising years, small business owners using life insurance with buy-sell agreements where life insurance is the financing tool upon the business partner's death, or life insurance targeted to cover the growing income tax liability on the insured's tax-qualified retirement account.

In many instances, the need for life insurance decreases over time. Protection for a declining mortgage or other debts is one example. As another example, older adults seeking to protect the rest of their expected income prior to retirement have a need for declining coverage over a time-period matching their planned retirement horizon. Traditional level death benefit policies will quickly result in over-insurance if the insured is relatively close to retirement.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

The invention claimed is:

1. A system for creating a customized, non-level death benefit life insurance policy wherein the death benefits automatically change periodically, up or down without new underwriting, according to a customized schedule, and providing a level premium quote for the customized benefit policy for a specified coverage period, comprising:

a user interface enabling an insured to simulate and evaluate, in real-time, different factors and assumptions associated with forecasting the insured's current and future benefit needs and view and update, in real-time, the customized benefit policy and the customized level premium quote estimate for the specified coverage period, the user interface displaying a plurality of adjustable functions for creating a personal profile including information pertaining to the insured's current and future death benefit needs, wherein input fields for the plurality of adjustable functions include numbers, sliders, tables, formulas, or data relationship components, the plurality of adjustable functions including the following:

a first function corresponding to the insured's demographic factors that impact the projected need for life insurance benefits;

a second function corresponding to the insured's economic factors related to a need for life insurance benefits;

a third function corresponding to the insured's family factors that impact the amount and timing of life insurance benefit needs;

a fourth function including adjustable fields corresponding to a plurality of expenses assumptions associated with projecting future expenses;

a fifth function including adjustable fields corresponding to income assumptions associated with projecting future sources of income; and a sixth function corresponding to the insured's health status factors associated with estimating the level premium quote for the specified coverage period;

a benefit determination model configured to, in response to the insured interacting with the first, second, third, fourth, and fifth functions:

determine projected life insurance benefits needed or desired as the insured ages;

discount the future benefits from each future age of the insured; and determine a customized policy benefit schedule during the specified coverage period;

a policy pricing model configured to, in response to the insured interacting with the sixth function, determine the level premium quote for the customized benefit policy for the specified coverage period;

wherein, the user interface is configured to:

display the level premium quote;

generate and display an interactive benefit curve comprising a plurality of adjustable portions that can be manipulated by the insured, the interactive benefit curve illustrating the customized benefit policy and the customized level premium quote estimate for the specified coverage period, the interactive benefit curve being configured to dynamically display a change in an amount of benefit over the specified coverage period based on inputs received via the user interface;

in response to the insured manipulating the adjustable portions of the interactive benefit curve, update the display in real-time to display a modified benefit curve associated with an updated level premium quote for the specified coverage period; and enable the insured to submit a formal application for the customized life insurance benefit policy and the updated level premium quote for the specified coverage period to a third-party system associated with an insurance carrier.

2. The system of claim 1, wherein the specified coverage period is based on at least one of a planned retirement age of the insured, a time period specified by the insured, and restrictions or requirements of the insurance carrier.

3. The system of claim 1, wherein the benefit schedule is a yearly benefit schedule.

4. The system of claim 1, wherein the first function includes fields associated with at least the insured's current age, planned retirement date, spousal status, and children status.

5. The system of claim 1, wherein the insured's economic factors include one or more of: current income, mortgage balances, other debts and respective amortization schedules, savings and retirement account balances, and existing life insurance coverage.

6. The system of claim 1, wherein the insured's family factors include one or more of: ages of any children, college tuition support plans, children with special needs, elderly parents, long-term care for the elderly parents, and other financial support needs.

7. The system of claim 1, wherein the expenses assumptions include one or more of: expenses for burial services, household support, childcare, long-term health care, and college tuition.

8. The system of claim 1, wherein the income assumptions include one or more of: future income, a portion of gross income for insurance coverage, savings and retirement account contribution rates, and investment returns.

9. The system of claim 1, wherein the sixth function includes displaying underwriting class input fields and general health assessment fields, the underwriting class input fields including one or more of age, gender, and smoker status.

10. The system of claim 9, wherein the sixth function further includes displaying computer-assisted definitions associated with one or more of the underwriting class input fields or general health assessment fields to assist with estimating a health underwriting class.

11. The system of claim 1, wherein plurality of adjustable functions further includes a seventh function corresponding to the insured's desire to gift life insurance benefits comprising death benefits designated for one or more of: charitable organizations, non-immediate family members, and beneficiaries inheriting income tax liabilities embedded with inherited tax-qualified retirement accounts.

12. The system of claim 1, wherein the policy pricing model determines the level premium quote based, at least in part, on one or more pricing factors selected from the group consisting of: (1) pricing assumptions and investment yield assumptions, (2) targeted profit margins corresponding to the specified coverage period, (3) expected mortality rate corresponding to an underwriting class, (4) the specified time periods and benefit schedule, (5) an expected persistency of the customized life insurance benefit policy, and (6) reserves and capital requirements.

13. The system of claim 1, wherein the user interface displays the level premium quote numerically or via other means based, at least in part, on the benefit schedule.

14. The system of claim 1, wherein the user interface is further configured to update the displayed customized benefit policy and the level premium quote in response to receiving updates to one or more of the input fields or the adjustable fields.

* * * * *